US012586786B2

(12) United States Patent
Ko et al.

(10) Patent No.: US 12,586,786 B2
(45) Date of Patent: Mar. 24, 2026

(54) CORE-SHELL PARTICLE AND LITHIUM ION BATTERY

(71) Applicant: INDUSTRIAL TECHNOLOGY RESEARCH INSTITUTE, Hsinchu (TW)

(72) Inventors: Kuan-Yu Ko, Zhudong Township (TW); Chun-Chi Tseng, New Taipei City (TW); Chia-Erh Liu, Zhubei City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 658 days.

(21) Appl. No.: 17/994,710

(22) Filed: Nov. 28, 2022

(65) Prior Publication Data

US 2024/0162431 A1     May 16, 2024

(30) Foreign Application Priority Data

Nov. 11, 2022     (TW) ................................. 111143108

(51) Int. Cl.

| | |
|---|---|
| *H01M 4/485* | (2010.01) |
| *H01M 4/36* | (2006.01) |
| *H01M 4/62* | (2006.01) |
| *H01M 10/0525* | (2010.01) |
| *H01M 4/02* | (2006.01) |

(52) U.S. Cl.
CPC ........... *H01M 4/485* (2013.01); *H01M 4/366* (2013.01); *H01M 4/626* (2013.01); *H01M*

*10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 6,677,392 | B2 | 1/2004 | Ravichandran et al. |
| 8,647,773 | B2 | 2/2014 | Goodenough et al. |
| 9,240,590 | B2 | 1/2016 | Harada et al. |
| 9,577,252 | B2 | 2/2017 | Park et al. |
| 9,627,680 | B2 | 4/2017 | Yukinobu et al. |

(Continued)

FOREIGN PATENT DOCUMENTS

| | | |
|---|---|---|
| CN | 105047871 A | 11/2015 |
| CN | 108878873 A | 11/2018 |

(Continued)

OTHER PUBLICATIONS

Extended European Search Report for European Application No. 23151436.5, dated Aug. 18, 2023.

(Continued)

*Primary Examiner* — Wyatt P McConnell
(74) *Attorney, Agent, or Firm* — Birch, Stewart, Kolasch & Birch, LLP

(57) ABSTRACT

A core-shell particle includes a core having a chemical structure of $Ti_{(1-x)}M1_xNb_{(2-y)}M2_yO_{(7-z)}Q_z$, in which M1 is Li or Mg; M2 is Fe, Mn, V, Ni, Cr, or Cu; Q is F, Cl, Br, I, or S; x is 0 to 0.15; y is 0 to 0.15; and z is 0 to 2; and a shell layer wrapping at least a portion of the surface of the core, and the shell layer includes Cu, Nb, Ti, and O.

9 Claims, 2 Drawing Sheets

(56)                    References Cited

U.S. PATENT DOCUMENTS

| | | | |
|---|---|---|---|
| 11,005,094 B2 | 5/2021 | Pan et al. | |
| 2019/0088941 A1* | 3/2019 | Harada | H01M 10/44 |
| 2020/0056088 A1 | 2/2020 | Veldman | |
| 2020/0140339 A1 | 5/2020 | Ko et al. | |

FOREIGN PATENT DOCUMENTS

| | | |
|---|---|---|
| CN | 109428066 A | 3/2019 |
| CN | 110943207 A | 3/2020 |
| CN | 111354923 A | 6/2020 |
| CN | 112106232 A | 12/2020 |
| JP | 2019-53945 A | 4/2019 |
| JP | 2020-105063 A | 7/2020 |

OTHER PUBLICATIONS

Taiwanese Office Action and Search Report for Taiwanese Application No. 111143108, dated Sep. 12, 2023.

Booker-Milburn et al., "Photochemistry of Benzotriazole: An Unprecedented Tautomer-Selective Intermolecular [2+2] Photocycloaddition", Organic Letters, vol. 4, No. 9, 2002, pp. 1487-1489.

El Khalfaouy et al., "Solution combustion synthesis and electrochemical properties of yttrium-doped LiMnPO4/C cathode materials for lithium ion batteries", Journal of Rare Earths, vol. 38, Issue 9, 2020, pp. 976-982.

Liu et al., "CuO-coated Li[Ni0.5Co0.2Mn0.3]O2 cathode material with improved cycling performance at high rates", Electrochimica Acta, vol. 85, 2012, pp. 605-611.

Yang et al. "Cu0.02Ti0.94Nb2.04O7: An advanced anode material for lithium-ion batteries of electric vehicles", Journal of Power Sources, vol. 328, 2016, pp. 336-344.

Yuan et al., "Recent Advances in Titanium Niobium Oxide Anodes for High-Power Lithium-Ion Batteries", Energy & Fuels, vol. 34, 2020, pp. 13321-13334.

Japanese Office Action for Japanese Application No. 2022-191932, dated Nov. 21, 2023, with an English translation.

* cited by examiner

CORE-SHELL PARTICLE AND LITHIUM ION BATTERY

CROSS REFERENCE TO RELATED APPLICATIONS

This present application is based on, and claims priority from, Taiwan Application Serial Number 111143108, filed on Nov. 11, 2022, the disclosure of which is hereby incorporated by reference herein in its entirety.

TECHNICAL FIELD

The technical field relates to a lithium-ion battery, and core-shell particles used in a negative electrode composition of the battery.

BACKGROUND

Although the major material used in conventional carbon negative electrodes has a good capacity (~350 mA/g), it still has issues about cycle lifetime, safety, fast charging, and the like. Lithium titanate ($Li_4Ti_5O_{12}$) is a fast rechargeable negative electrode material with a long lifetime and high safety, but its capacity is low (~165 mAh/g). Titanium niobate ($TiNb_2O_7$, TNO) is suitable for use as a fast rechargeable negative electrode of the next generation due to higher theoretical capacity (~380 mAh/g), having working potential of 1.6V which can hinder dendrite growth, good safety, high cycle lifetime, and high tapped density. A conventional lithium battery has high energy density, but has poor charging rate (<5C, charging capacity of 50%). A lithium titanate battery has a fast charging rate (>5C, charging capacity of at least 80%), but has insufficient energy density, limiting its application in energy density. Compared to lithium titanate, titanium niobate has higher capacity and energy density, and may greatly increase the energy density of a fast rechargeable lithium battery. Titanium niobate can therefore be widely applied to improve the durability and charging rate of electric vehicles; to enhance the energy storage density of energy storage systems; and to reduce the charging time of consumer electronics. In addition, titanium niobate has excellent properties at low temperatures, allowing it to adapt to various harsh environments. However, titanium niobate has poor electrical conductivity. Titanium niobate requires further improvement to make its application possible as an active material in power lithium batteries, and to obtain better performance such as charge-discharge capacity and cycle life.

SUMMARY

One embodiment of the disclosure provides a core-shell particle, includes a core having a chemical structure of $Ti_{(1-x)}M1_xNb_{(2-y)}M2_yO_{(7-z)}Q_z$, wherein M1 is Li or Mg; M2 is Fe, Mn, V, Ni, Cr, or Cu; Q is F, Cl, Br, I, or S; x is 0 to 0.15; y is 0 to 0.15; and z is 0 to 2; and a shell layer, wrapping at least a portion of the surface of the core, and the shell layer includes Cu, Nb, Ti, and O.

One embodiment provides a lithium battery, including: a negative electrode; a positive electrode; and an electrolyte, disposed between the negative electrode and the positive electrode, wherein the negative electrode comprises a core-shell particle, includes a core having a chemical structure of $Ti_{(1-x)}M1_xNb_{(2-y)}M2_yO_{(7-z)}Q_z$, wherein M1 is Li or Mg; M2 is Fe, Mn, V, Ni, Cr, or Cu; Q is F, Cl, Br, I, or S; x is 0 to 0.15; y is 0 to 0.15; and z is 0 to 2; and a shell layer, wrapping at least a portion of the surface of the core, and the shell layer includes Cu, Nb, Ti, and O.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1A:
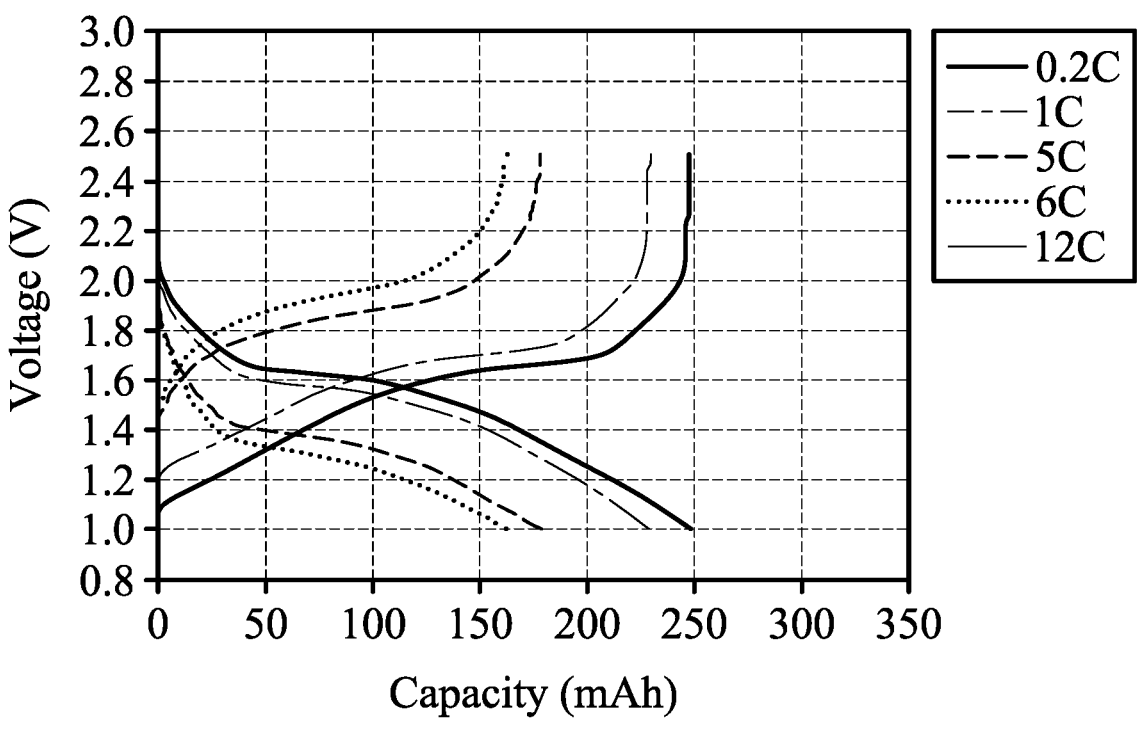
FIG. 1A shows curves of the voltages versus the capacities of a battery at different charge-discharge rates according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a core-shell particle, which includes: a core having chemical structure of $Ti_{(1-x)}M1_xNb_{(2-y)}M2_yO_{(7-z)}Q_z$, wherein M1 is Li or Mg; M2 is Fe, Mn, V. Ni, Cr, or Cu; Q is F, Cl, Br, I, or S; x is 0 to 0.15; y is 0 to 0.15; and z is 0 to 2; and a shell layer wrapping at least a portion of the surface of the core, and the shell layer includes Cu, Nb, Ti, and O. In some embodiments, the forming method of the core-shell particles includes mixing a niobium source, a titanium source, and other optional dopants (eg, a fluorine source, optionally), follows by sintering to form the core. Then, the core is mixed with a copper source to form a copper-containing shell layer oil the core to obtain core-shell particles. It is worth noting that the copper source is not premixed with niobium source, titanium source, and other dopants prior to the sintering step, if the copper source, niobium source, titanium source are mixed before sintering, then copper-doped titanium niobate material is obtained, rather than a core-shell particle with copper containing shell layer and titanium niobate core. For the core-shell particle. Cu in the shell layer partially diffuses into the core, while Nb and Ti in the core partially diffuse into the shell layer. Even so, there is a distinct interface between the shell layer and the core, the shell layer is an amorphous structure, while the core is a crystalline structure. In addition, the main metal composition of the core is Ti and Nb, while the main metal composition of the shell layer is Cu.

In one embodiment, the weight ratio between the core and the shell layer is 1:0.004 to 1:0.02. If the weight ratio of the shell layer is too large, the intercalation and de intercalation of lithium ions may be hindered. If the weight ratio of the shell layer is too small, the core-shell particle material behaves similarly to that without the shell layer.

In some embodiments, the shell layer has a Cu content of 5 to 15 atomic %, a Nb content of 0 to 5 atomic %, a Ti content of 0 to 6 atomic %, and an O content of 70 to 90 atomic %. The content of Nb and Ti in the shell layer depend on the temperature and time of sintering to form the copper-containing shell layer. If the sintering temperature is too high or the sintering time is too long, the thickness of the shell layer may be too thick which may hinder the intercalation and de-intercalation of the lithium ions. If the sintering temperature is too low or the sintering time is too short, the reaction may be incomplete with residual copper sulfate remained, causing higher surface resistance.

In some embodiments, the thickness of the shell layer is 5 nm to 50 nm. If the shell layer is too thin, the core-shell particle material behaves similarly to that without the shell layer. If the shell layer is too thick, the intercalation and intercalation of the lithium ions may be hindered.

In some embodiments, the shell layer is a discontinuous film. For example, a portion of the core surface may be exposed from the shell layer. However, in other embodiments, the shell layer may cover the core surface completely.

In some embodiments, the median primary particle size (D50) of the core-shell particles is 100 nm to 400 nm. If the primary particle size of the core-shell particles is too large, the conducting paths of the electrons and the lithium ions may be increased, and the conducting time scale may be extended, thereby reducing the rate capability. If the median primary particle size (D50) of the core-shell particles is too small, the specific surface area of the material may be expanded, causing poor dispersion during mixing, and reducing the density and uniformity of the material on the electrode.

An embodiment of the present disclosure provides a lithium ion battery, including: a negative electrode; a positive electrode; and an electrolyte, disposed between the negative electrode and the positive electrode, wherein the negative electrode includes the core-shell particles. The negative electrode may further include conductive carbon black, a binder, or other suitable composition.

In some embodiments, the negative electrode further includes lithium titanate particles, and the weight ratio of the core-shell particles to the lithium titanate particles is 90:10 to 10:90, in order to improve the rate performance of the negative electrode and to reduce the material cost. If the amount of the lithium titanate is too low, the negative electrode behaves similarly to that without the lithium titanate particle. If the amount of lithium titanate is too high, the gram capacitance of the composite material will drop significantly. For example, the chemical structure of lithium titanate is $Li_4Ti_5O_a$, and $8 \leq a \leq 12$.

In some embodiments, the positive electrode includes lithium cobaltate, lithium nickelate, lithium manganate, ternary, positive electrode material, lithium iron phosphate, lithium iron manganese phosphate, or a combination thereof. In some embodiments, the electrolytes can be classified into liquid, colloidal, and solid states according to their morphology. Liquid electrolytes are composed of lithium salts, solvents or ionic liquids. Commonly used lithium salts are $LiPF_6$, $LiAsF_6$, $LiClO_4$, $LiBF_4$, LiTFSI, or $LiCF_3SO_3$, etc., and commonly used solvents are cyclic carbonates (such as ethylene carbonate, propylene carbonate), linear carbonate (such as dire ethyl carbonate, diethyl carbonate, ethyl methyl carbonate), or ether compounds (such as dimethyl ether, 1,3-dioxolane) and the like. Solid electrolytes are divided into polymers and glass ceramics. In contrast, when measuring the performance of the negative electrode with core-shell particles, the negative electrode can be assembled with lithium metal positive electrode and typical electrolyte to form a half-cell with lithium positive electrode and electrolyte.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Comparative Example 1

Niobium oxide, titanium oxide, and fluorine source ($Mg_2F$) of stoichiometric ratio were added to de-ionized water containing dispersant PVA BP-05, and then completely mixed for 18 hours to obtain a thoroughly dispersed slurry. The thoroughly dispersed slurry was pelletized by spray drying to obtain precursor powder. The precursor powder was put into a crucible and sintered at 1015° C. for 3 hours to obtain fluorine-doped titanium niobate material $Mg_{0.02}Ti_{0.98}Nb_2O_{6.96}F_{0.04}$.

Figure 1B:
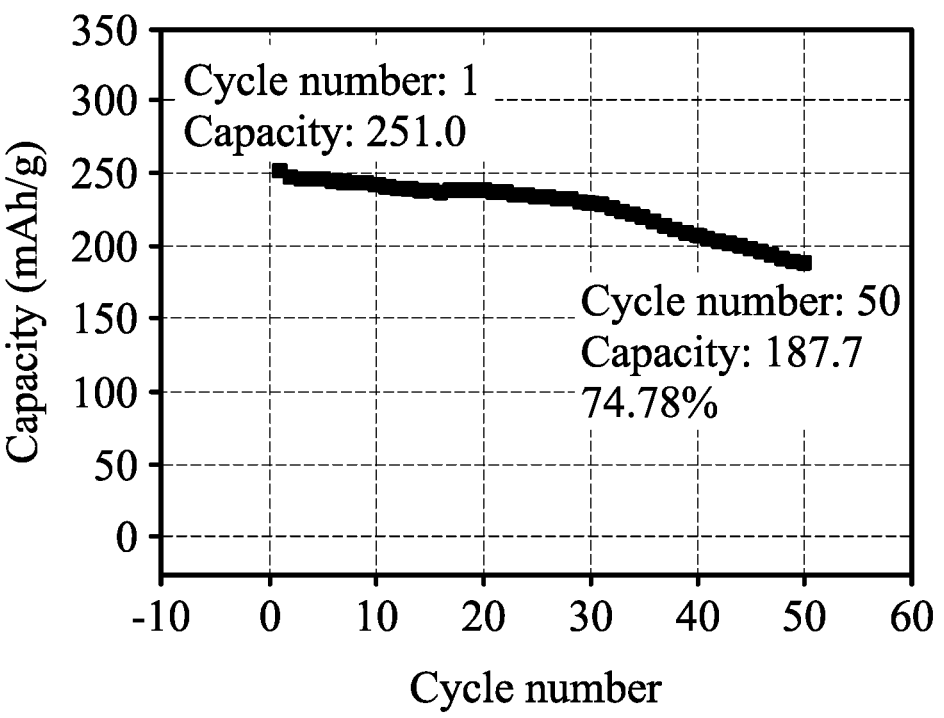
FIG. 1B shows the capacities corresponding to the charge and discharge cycling numbers according to an embodiment of the disclosure.

85 parts by weight of the fluorine-doped titanium niobate, 6 parts by weight of KS4 (commercially available from TIMCAL TIMREX), 4 parts by weight of Super P (commercially available from TIMCAL TIMREX), and 5 parts by weight of PVDF (commercially available from Solef) were thoroughly mixed to prepare a paste, and the paste was then coated on an aluminum foil to form a coating layer with a thickness less than 150 micrometers. The coating layer was rolled through a calendering machine to have 65% of the original thickness, thereby forming a negative electrode plate. The negative electrode plate was cut to a circle shape with a diameter of 12 mm. The circular negative electrode plate, a lithium metal positive electrode plate, and an electrolyte were assembled to form CR2032 half-cell to test their electrochemical properties. The electrolyte composition was 1M $LiPF_6$ solution, and the solvent was ethylene carbonate (EC) and dimethyl carbonate (DMC) (EC:DMC=1:2, v/v). FIG. 1A shows curves of the voltages versus the capacities of the battery at different charge-discharge rates, the discharging is carried out at constant current-constant voltage, while the charging is carried out at constant current with a charging rate of 1C. FIG. 1B shows curves of the capacities versus the charge-discharge cycling number of the battery. Table 1 shows the capacities versus voltages of the battery at different charge-discharge rates and the capacitance retention of the battery after 50 cycles.

Example 1

20 g of the fluorine and magnesium doped titanium niobate material $Mg_{0.02}Ti_{0.98}Nb_2O_{6.96}F_{0.04}$ prepared from Comparative Example 1 was added to 0.3139 g of $CuSO_4 \cdot 5H_2O$ aqueous solution, and stirred thoroughly at room temperature, then heated up to 100° C. to evaporate water to obtain dry powder. Then the dry powder was put into an alumina crucible, and after sintering at 700° C. for 2 hours, core-shell particles with titanium niobate doped with fluorine and magnesium core, wrapped with a surface-coated shell layer (containing copper) were obtained.

Figure 2A:
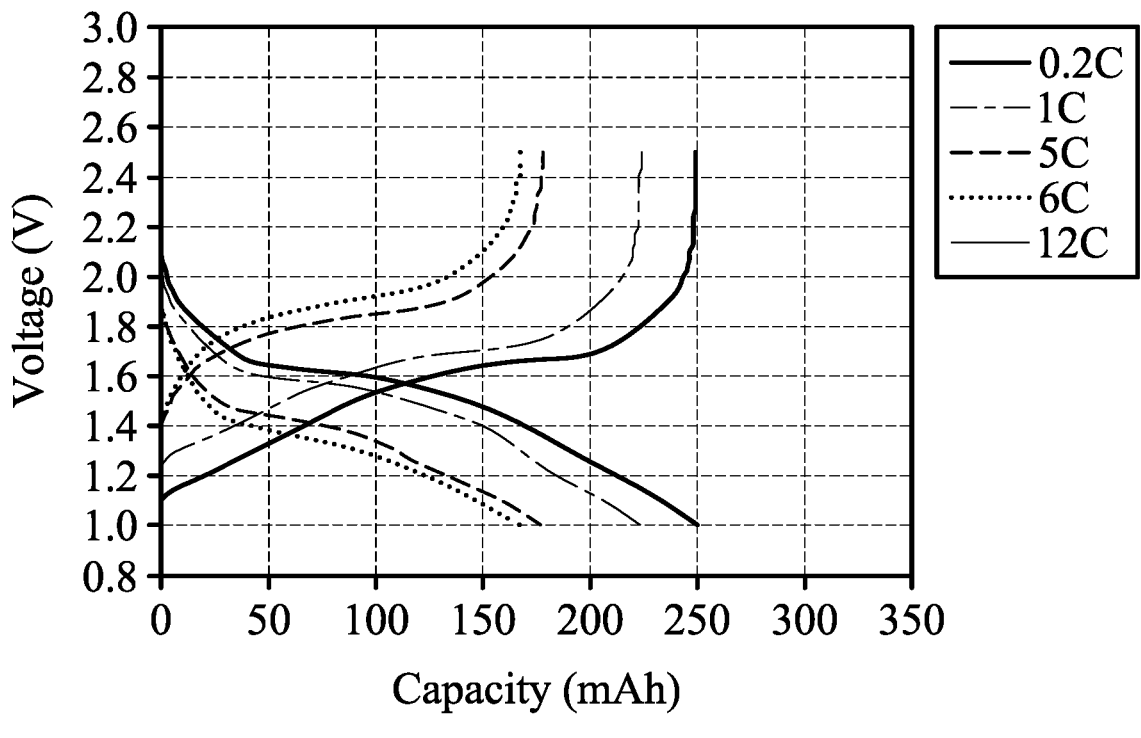
FIG. 2A shows curves of the voltages versus the capacities of a battery at different charge-discharge rates according to an embodiment of the disclosure.
Figure 2B:
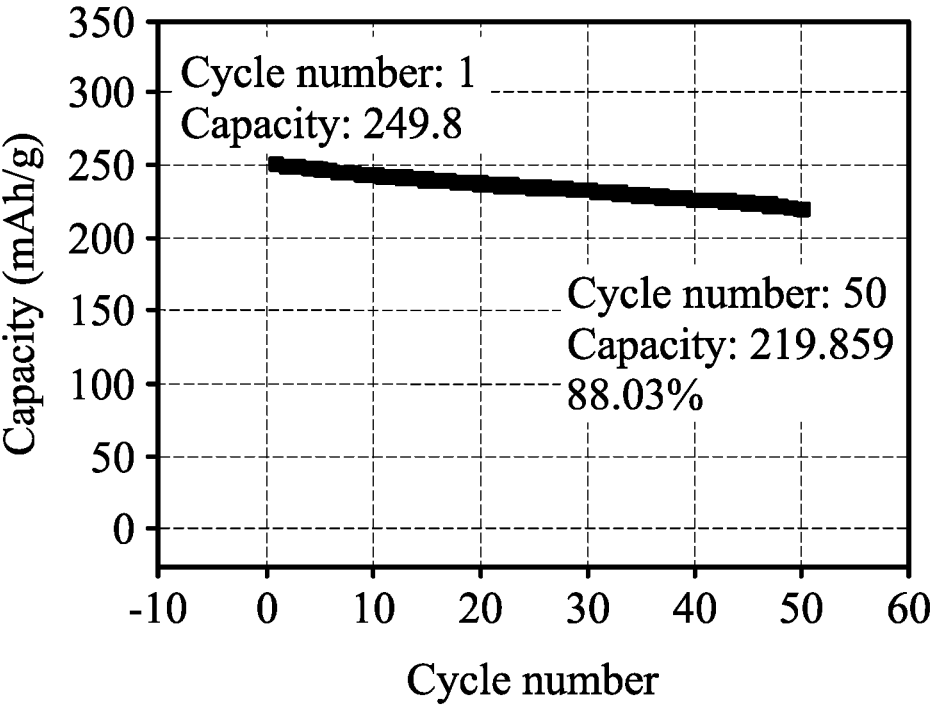
FIG. 2B shows the capacities corresponding to the charge and discharge cycling numbers according to an embodiment of the disclosure.

85 parts by weight of the fluorine-doped titanium niobate, 6 parts by weight of KS4 (commercially available from TIMCAL TIMREX), 4 parts by weight of Super P (commercially available from TIMCAL TIMREX), and 5 parts by weight of PVDF (commercially available from Solef) were thoroughly mixed to prepare a paste, and the paste was then coated on an aluminum foil to form a coating layer with a thickness less than 150 micrometers. The coating layer was rolled through a calendering machine to have 65% of the original thickness, thereby forming a negative electrode plate. The negative electrode plate was cut to a circle shape with a diameter of 12 mm. The circular negative electrode plate, a lithium metal positive electrode plate, and an electrolyte were assembled to form CR2032 half-cells to test their electrochemical properties. The electrolyte composition was 1M $LiPF_6$ solution, and the solvent was ethylene carbonate (EC) and dimethyl carbonate (DMC) (EC: DMC=1:2, v/v). FIG. 2A shows curves of the voltages versus the capacities of the battery at different charge-discharge rates, the discharging is carried out at constant current-constant voltage, while the charging is carried out at constant current with a charging rate of 1C. FIG. 2B shows curves of the capacities versus the charge-discharge cycling number of the battery. Table 1 shows the capacities versus the voltages of the battery at different charge-discharge rates and the capacitance retention of the battery after 50 cycles.

Comparative Example 2

20 g of the fluorine and magnesium-doped titanium niobate material $Mg_{0.02}Ti_{0.98}Nb_2O_{6.96}F_{0.04}$ prepared from Comparative Example 1 was added to 0.315 g of $AgNO_3$ aqueous solution, and stirred thoroughly at room temperature, then heated up to 90° C. to evaporate water to obtain dry powder. Then the dry powder was put into an alumina crucible, and after sintering at 700° C. for 1 hour, core-shell particles with titanium niobate doped with fluorine and magnesium core, wrapped with a surface coated-shell layer (containing copper silver) were obtained.

85 parts by weight of the core-shell particle, 6 parts by weight of KS4 (commercially available from TIMCAL TIMREX), 4 parts by weight of Super P (commercially available from TIMCAL TIMREX), and 5 parts by weight of PVDF (commercially available from Solef) were thoroughly mixed to prepare a paste, and the paste was then coated on an aluminum foil to form a coating layer with a thickness less than 150 micrometers. The coating layer was rolled through a calendering machine to have 65% of the original thickness, thereby forming a negative electrode plate. The negative electrode plate was cut to a circle shape with a diameter of 12 mm. The circular negative electrode plate, a lithium metal positive electrode plate, and an electrolyte were assembled to form CR2032 half-cells to test their electrochemical properties. The electrolyte composition was 1M $LiPF_6$ solution, and the solvent was ethylene carbonate (EC) and dimethyl carbonate (DMC) (EC:DMC=1:2, v/v). Table 1 shows the capacities versus voltages of the battery at different charge-discharge rates and the capacitance retention of the battery after 50 cycles.

TABLE 1

| | Capacity at 0.2 C/ 0.2 C (mAh/g) | Capacity at 1 C/ 1 C (mAh/g) | Capacity at 5 C/ 5 C (mAh/g) | Capacity at 6 C/ 6 C (mAh/g) | Capacity retention after 50 cycles at 1 C/1 C |
|---|---|---|---|---|---|
| Comparative Example 1 | 248.5 | 228.9 | 178.0 | 163.3 | 74.78% |
| Example 1 | 250.5 | 229.4 | 183.2 | 172.5 | 88.03% |
| Comparative Example 2 | 250.6 | 228.8 | 151.4 | 133.5 | 74.4% |

Compared with those without shell material, and with core-shell particles with shell containing silver, the core-shell particles with shell containing copper have higher charge-discharge capacity and longer cycle time.

Comparative Example 3

Niobium oxide and titanium oxide of stoichiometric ratio were added to de-ionized water containing PVA BP-05 dispersant, and then mixed thoroughly for 18 hours to obtain a thoroughly dispersed slurry paste. The thoroughly dispersed slurry was pelletized by spray drying to obtain precursor powder. The precursor powder was put into an aluminum crucible and sintered at 1100° C. for 12 hours to obtain titanium niobate material $TiNb_2O_7$.

85 parts by weight of the titanium niobate, 6 parts by weight of KS4 (commercially available from TIMCAL TIMREX), 4 parts by weight of Super P (commercially available from TIMCAL TIMREX), and 5 parts by weight of PVDF (commercially available from Solef) were thoroughly mixed to prepare a paste, and the paste was then coated on an aluminum foil to form a coating layer with a thickness less than 150 micrometers. The coating layer was rolled through a calendering machine to have 65% of the original thickness, thereby forming a negative electrode plate. The negative electrode plate was cut to a circle shape with a diameter of 12 mm. The circular negative electrode plate, a lithium metal positive electrode plate, and an electrolyte were assembled to form CR2032 half-cells to test their electrochemical properties. The electrolyte composition was 1M $LiPF_6$ solution, and the solvent was ethylene carbonate (EC) and dimethyl carbonate (DMC) (EC:DMC=1:2, v/v). Table 3 shows the capacities of the battery at different charge-discharge rates.

Example 2

20 g of the titanium niobate material $TiNb_2O_7$ prepared from Comparative Example 3 was added to 0.3139 g of $CuSO_4 \cdot 5H_2O$ aqueous solution, and stirred thoroughly at room temperature, then heated up to 100° C. to evaporate water to obtain dry powder. Then the dry powder was put into an alumina crucible, and after sintering at 600° C. for 1 hour, core-shell particles with titanium niobate core, wrapped with a surface-coated shell layer (containing copper) were obtained. The element compositions at different positions in the shell layer and the core are analyzed by X-ray energy dispersive analyzer (EDX), as shown in Table 2:

TABLE 2

| | shell layer | | | core | |
|---|---|---|---|---|---|
| | position 1 | position 2 | position 3 | position 4 | position 5 |
| O | 86.63 | 86.57 | 75.24 | 61.05 | 62.94 |
| Ti | 1.43 | 2.54 | 4.85 | 14.18 | 14.24 |
| Cu | 11.38 | 8.62 | 14.05 | 3.95 | 3.74 |
| Nb | 0.55 | 2.27 | 5.87 | 20.83 | 19.08 |
| Total | 100 | 100 | 100 | 100 | 100 |

It can be seen from Table 2 that within the shell layer there are some Ti and Nb diffused from the core to the shell layer, and within the core some Cu diffused from the shell layer to the core. In spite of that, the shell layer mainly contains Cu, while the core mainly contains Nb and Ti.

85 parts by weight of the titanium niobate, 6 parts by weight of KS4 (commercially available from TIMCAL TIMREX), 4 parts by weight of Super P (commercially available from TIMCAL TIMREX), and 5 parts by weight of PVDF (commercially available from Solef) were thoroughly mixed to prepare a paste, and the paste was then coated on aluminum foil to form a coating layer with a thickness less than 150 micrometers. The coating layer was rolled through a calendering machine to have 65% of the original thickness, thereby forming a negative electrode plate. The negative electrode plate was cut to a circle shape with a diameter of 12 mm. The circular negative electrode plate, a lithium metal positive electrode plate, and an electrolyte were assembled to form CR2032 half-cells to test their electrochemical properties. The electrolyte composition was 1M $LiPF_6$ solution, and the solvent was ethylene carbonate (EC) and dimethyl carbonate (DMC) (EC:DMC=1:2, v/v). Table 3 shows the capacities of the battery at different charge-discharge rates.

Example 3

20 g of the titanium niobate material $TiNb_2O_7$ prepared from Comparative Example 1 was added to 0.3139 g of $CuSO_4 \cdot 5H_2O$ aqueous solution, and stirred thoroughly at room temperature, then heated tip to 100° C. to evaporate water to obtain dry powder. Then the dry powder was put into an alumina crucible, and after sintering at 700° C. for 1 hour, core-shell particles with titanium niobate core, wrapped with a surface-coated shell (containing copper) were obtained.

85 parts by weight of the titanium niobate, 6 parts by weight of KS4 (commercially available from TIMCAL TIMREX), 4 parts by weight of Super P (commercially available from TIMCAL TIMREX), and 5 parts by weight of PVDF (commercially available from Solef) were thoroughly mixed to prepare a paste, and the paste was then coated on an aluminum foil to form a coating layer with a thickness less than 150 micrometers. The coating layer was rolled through a calendering machine to have 65% of the original thickness, thereby forming a negative electrode plate. The negative electrode plate was cut to a circle shape with a diameter of 12 mm. The circular negative electrode plate, a lithium metal positive electrode plate, and an electrolyte were assembled to form CR2032 half-cells to test their electrochemical properties. The electrolyte composition was 1M $LiPF_6$ solution, and the solvent was ethylene carbonate (EC) and dimethyl carbonate (DMC) (EC:DMC=1:2, v/v). Table 3 shows the capacities of the battery at different charge-discharge rates.

Example 4

20 g of the titanium niobate material $TiNb_2O_7$ prepared from Comparative Example 3 was added to 0.6278 g of $CuSO_4 \cdot 5H_2O$ aqueous solution, and stirred thoroughly at room temperature, then heated up to 100° C. to evaporate water to obtain dry powder. Then the dry powder was put into an alumina crucible, and after sintering at 600° C. for 1 hour, core-shell particles with titanium niobate core, wrapped with a surface-coated shell (containing copper) were obtained.

85 parts by weight of the titanium niobate, 6 parts by weight of KS4 (commercially available from TIMCAL TIMREX), 4 parts by weight of Super P (commercially available from TIMCAL TIMREX), and 5 parts by weight of PVDF (commercially available from Solef) were thoroughly mixed to prepare a paste, and the paste was then coated on an aluminum foil to form a coating layer with a thickness less than 150 micrometers. The coating layer was rolled through a calendering machine to have 65% of the original thickness, thereby forming a negative electrode plate. The negative electrode plate was cut to a circle shape with a diameter of 12 mm. The circular negative electrode plate, a lithium metal positive electrode plate, and an electrolyte were assembled to form CR2032 half-cell to test their electrochemical properties. The electrolyte composition was 1M $LiPF_6$ solution, and the solvent was ethylene carbonate (EC) and dimethyl carbonate (DMC) (EC:DMC=1:2, v/v). Table 3 shows the capacities of the battery at different charge-discharge rates.

Comparative Example 4

5.38 g of niobium oxide, 4.72 g of titanium oxide, and 0.6278 of $CuSO_4 \cdot 5H_2O$ were added to deionized water containing dispersant PVA BP-05, and mixed thoroughly for 18 hours to obtain a thoroughly dispersed slurry. The thoroughly dispersed slurry was pelletized by spray drying to obtain precursor powder. The precursor powder was put into an aluminum crucible and sintered at 1015° C. for 3 hours to obtain copper-doped titanium niobate, in the present example the copper is doped thoroughly in the titanium niobate, rather than forming a shell layer coated titanium niobate core, 85 parts by weight of the titanium niobate, 6 parts by weight of KS4 (commercially available from TIMCAL TIMREX), 4 parts by weight of Super P (commercially available from TIMCAL TIMREX), and 5 parts by weight of PVDF (commercially available from Solef) were thoroughly mixed to prepare a paste, and the paste was then coated on an aluminum foil to form a coating layer with a thickness less than 150 micrometers. The coating layer was rolled through a calendering machine to have 65% original thickness, thereby forming a negative electrode plate. The negative electrode plate was cut to a circle shape with a diameter of 12 mm. The circular negative electrode plate, a lithium metal positive electrode plate, and an electrolyte were assembled to form CR2032 half-cells to test their electrochemical properties. The electrolyte composition was 1M $LiPF_6$ solution, and the solvent was ethylene carbonate (EC) and dimethyl carbonate (DMC) (EC:DMC=1:2, v/v). Table 3 shows the capacities of the battery at different charge-discharge rates

TABLE 3

| | Capacity at 0.2 C/0.2 C (mAh/g) | Capacity at 1 C/1 C (mAh/g) | Capacity at 5 C/5 C (mAh/g) | Capacity at 6 C/6 C (mAh/g) |
|---|---|---|---|---|
| Comparative Example 3 (w/o shell layer) | 233.4 | 196.9 | 110.1 | 98.5 |
| Example 2 (w/ Cu shell layer) | 259.4 | 231.7 | 151.6 | 126.4 |
| Example 3 (w/ Cu shell layer) | 250.9 | 226.3 | 151.3 | 124.0 |
| Example 4 (w/ Cu shell layer) | 252.5 | 227.7 | 154.9 | 133.2 |
| Comparative Example 4 (doped Cu, w/o shell layer) | 247.3 | 217.4 | 144.0 | 114.4 |

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A core-shell particle, comprising:

a core, having chemical structure of $Ti_{(1-x)}M1_xNb_{(2-y)}$ $M2_yO_{(7-z)}Q_z$, wherein M1 is Li or Mg, M2 is Fe, Mn, V, Ni, Cr, or Cu, Q is F, Cl, Br, I, or S, x is 0 to 0.15, y is 0 to 0.15, and z is 0 to 2; and a shell layer wrapping at least a portion of the surface of the core, and the shell layer comprises Cu, Nb, Ti, and O, wherein the shell layer is an amorphous structure.

2. The core-shell particle as claimed in claim 1, wherein the core and the shell layer have a weight ratio of 1:0.004 to 1:0.02.

3. The core-shell particle as claimed in claim 1, wherein the shell layer has a Cu content of 5 to 15 atomic %, a Nb content of greater than 0 to 5 atomic %, a Ti content of greater than 0 to 6 atomic %, and an O content of 70 to 90 atomic %.

4. The core-shell particle as claimed in claim 1, wherein the shell layer has a thickness of 5 nm to 50 nm.

5. The core-shell particle as claimed in claim 1, wherein the shell layer is a discontinuous film.

6. The core-shell particle as claimed in claim 1, wherein the median primary particle size (D50) of the core-shell particles is 100 nm to 400 nm.

7. A lithium ion battery, comprising:

a negative electrode;

a positive electrode; and an electrolyte disposed between the negative electrode and the positive electrode, wherein the negative electrode comprises the core-shell particle as claimed in claim 1.

8. The lithium ion battery as claimed in claim 7, wherein the negative electrode further comprises a lithium titanate particle, the core-shell particle and the lithium titanate particle have a weight ratio of 90:10 to 10:90.

9. The lithium ion battery as claimed in claim 7, wherein the positive electrode comprises lithium cobaltate, lithium nickelate, lithium manganate, ternary positive electrode material, lithium iron phosphate, lithium iron manganese phosphate, or a combination thereof.

* * * * *